United States Patent Office 3,600,472
Patented Aug. 17, 1971

3,600,472
O-(2,5 - DICHLORO-4-ALKYLMERCAPTOPHENYL) THIONOPHOSPHATES AND THIONOPHOSPHONATES
Richard Sehring and Wolfgang Buck, Ingelheim (Rhine), Germany, assignors to C. H. Boehringer Sohn, Ingelheim (Rhine), Germany
No Drawing. Filed Nov. 15, 1967, Ser. No. 683,125
Claims priority, application Germany, Nov. 22, 1966, B 89,951; July 11, 1967, B 93,427
Int. Cl. A01n 9/36; C07f 9/18, 9/40
U.S. Cl. 260—949            8 Claims

ABSTRACT OF THE DISCLOSURE

The compounds are O-(2,5-dichloro-4-alkylmercaptophenyl) - thionophosphates and analogous thionophosphonates, useful as insecticides and acaricides.

THE PRIOR ART

German Pat. No. 1,116,656 discloses O,O-dialkyl-O-(3-alkyl-4-alkylmercapto-phenyl) - thionophosphates having insecticidal and acaricidal properties.

This invention relates to novel thionophosphates and thionophosphonates and to a novel process for preparing these compounds, as well as to novel 2,5-dichloro-4-alkyl-mercapto-phenol starting compounds.

More particularly, the present invention relates to O-alkyl - O - (2,5 - dichloro - 4 - alkylmercapto-phenyl)-thionophosphates and analogous thionophosphonates of the formula

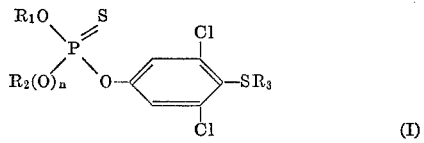

(I)

wherein
$R_1$ is alkyl of 1 to 4 carbon atoms,
$R_2$ is alkyl to 1 to 3 carbon atoms or phenyl,
$R_3$ is alkyl of 1 to 4 carbon atoms, and
$n$ is 0 or 1.

A compound of the Formula I is prepared in accordance with the present invention by reacting a salt, preferably an alkali metal or ammonium salt, of a 2,5-di-chloro-4-alkylmercapto-phenol of the formula

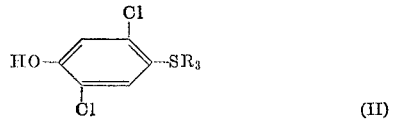

(II)

wherein $R_3$ has the same meanings as in Formula I, with a phosphorus compound of the formula

(III)

wherein $R_1$, $R_2$ and $n$ have the same meanings as in Formula I and Hal is halogen, at moderately elevated temperatures.

The 2,5 - dichloro - 4 - alkylmercapto - phenols of the Formula II and their salts are new compounds which could not be economically prepared by the methods heretofore described in the literature, although a number of processes have been disclosed for the preparation of hydroxyaryl-thioethers.

For example, German Pat. No. 1,051,863 discloses the preparation of aryl-thioethers by reacting a chloro- or alkyl-substituted phenol with a dialkyl disulfide in the presence of fuller's earth or of at least an equimolar amount of a condensation agent of the Friedel-Crafts type.

German Pat. No. 1,063,177 discloses a process for the preparation of hydroxyarylalkyl-thioethers which comprises reacting a monocyclic or bicyclic phenol which may be alkyl- and/or halo-substituted and has at least one free p- or o-position with respect to the phenolic hydroxyl group with an alkylsulfenyl chloride at a temperature up to about 30° C., the alkylsulfenyl chloride is formed in situ in the reaction mixture from a dialkyl disulfide or alkylthio and sulfuryl chloride.

Finally, German Pat. No. 1,088,980 describes the preparation of aromatic-aliphatic hydroxythioethers by reacting an aliphatic sulfoxide with a phenol in the presence of hydrogen chloride or thionyl chloride, and cleaving the sulfonium salt formed thereby in customary fashion to obtain the desired aromatic-aliphatic hydroxy-thioether.

All of these prior art processes, however, produce only moderate yields of the desired hydroxyaryl-thioethers.

We have discovered that a 2,5-dichloro-4-alkyl-mercaptophenol may be obtained with very good yields from an alkyl-(2,4,5-trichloro-phenyl)-sulfide under alkaline ether cleavage conditions. The reaction in accordance with the presence invention proceeds pursuant to the following reaction equation.

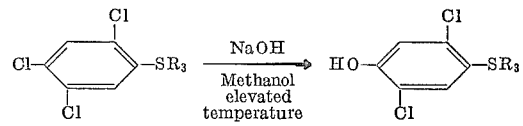

wherein $R_3$ has the same meanings as in Formula I. Our discovery is unexpected and surprising in view of the fact that it is well known that 2,4,5-trichloro-anisole is transformed into 2,4,5-trichloro-phenol in hot methanolic alkali pursuant to the following reaction equation:

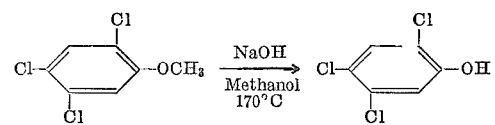

Thus, it could not have been foreseen that the analogous alkylthioether would not undergo cleavage of the ether linkage under similar conditions.

The alkyl - (2,4,5 - trichloro - phenyl) - sulfides required as starting compounds for the novel process according to the present invention may be prepared by well known methods, such as by reducing trichlorobenzene sulfochloride with nascent hydrogen generated by zinc and hydrochloric acid, followed by alkylation.

German Pat. No. 1,116,656 describes the preparation of O - (methylmercapto - substituted phenyl) - O,O-dialkyl-thionophosphates in an anhydrous medium. We have further discovered that excellent yields of the novel O,O-dialkyl-O-(2,5 - dichloro - 4 - alkylmercapto - phenyl)-thionophosphates according to the present invention may also be obtained by reacting a 2,5-dichloro-4-alkylmercapto-phenol with an O,O-dialkyl-thionophosphoric acid halide in aqueous solution.

In comparison to the process described in German Pat. No. 1,116,656, the process according to the present invention is considerably simpler and more economical. It is not possible, however, to apply the process for the preparation of the compounds pursuant to the present invention in an aqueous medium to those described in German Pat. No. 1,116,656 without sacrificing a significant amount of the yield. For instance, the yield of O,O-dimethyl - O - (4 - methylmercapto - 3 - methyl - phenyl)-thionophosphate in an anhydrous medium is in excess of 90% of theory, whereas the yield in an aqueous medium is barely 70% of theory.

The following examples further illustrate the present invention and will enable others skilled in the art to understand it more completely. It should be understood, however, that the invention is not limited solely to the particular examples given below.

EXAMPLE 1

Preparation of 2,5-dichloro-4-methylmercapto-phenol

A mixture of 455 gm. of 2,4,5-trichloro-anisole, 370 gm. of an aqueous 48% sodium hydroxide solution and 1 liter of methanol was heated for six hours at 160° C. in an autoclave. Thereafter, the reaction mixture was vacuum filtered, the methanol was distilled out of the filtrate, and the distillation residue was diluted with water. The dilute aqueous solution was filtered through charcoal, the filtrate was acidified with concentrated hydrochloric acid, and the acid solution was extracted with methylene chloride. The extract solution was dried over sodium sulfate, and the methylene chloride was distilled off, leaving as a residue 355 gm. (85% of theory) of 2,5 - dichloro - 4 - methylmercapto - phenol, B.P. 110° C. at 0.05 mm. Hg. After recrystallization from benzene the product had a melting point of 110–112° C.

*Analysis.*—Calculated (percent): Cl, 33.9; S, 15.30. Found (percent): Cl, 33.8; S, 15.34.

EXAMPLE 2

Preparation of O,O-diethyl-O-(2,5-dichloro-4-methylmercapto-phenyl)-thionophosphate 188 gm. (1.1 mols) of O,O-diethyl-thionophosphoric acid chloride were slowly added dropwise at 60° C. to a mixture of 209 gm. (1 mol) of 2,5-dichloro-4-methylmercapto-phenol, 40 gm. of sodium hydroxide and 150 cc. of water. The resulting mixture was stirred for three hours at 60° C., and then 100 cc. of 2 N sodium hydroxide were added thereto, and the mixture was allowed to cool. Thereafter, the aqueous phase was separated and extracted several times with toluene. The organic extract solutions were combined, dried over sodium sulfate, and the toluene was distilled off. 332 gm. (92% of theory) of O,O - diethyl - O - (2,5 - dichloro-4-methylmercapto - phenyl) - thionophosphate, B.P. 150–151° C. at 0.001 mm. Hg, of the formula

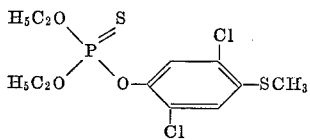

were obtained.

*Analysis.*—Calculated (percent): C, 36.52; Cl, 19.32. Found (percent): C, 36.60; Cl, 19.41.

EXAMPLE 3

Preparation of O,O-dimethyl-O-(2,5-dichloro-4-methylmercapto-phenyl)-thionophosphate Using a procedure analogous to that described in Example 2, 304 gm. (91% of theory) of O,O-dimethyl-O-(2,5 - dichloro - 4 - methylmercapto - phenyl) - thionophosphate, B.P. 139–140° C. at 0.001 mm. Hg, of the formula

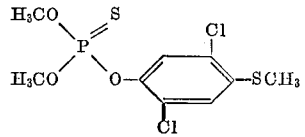

were obtained by reacting one mol of 2,5-dichloro-4-methylmercapto-phenol with one mol of O,O-dimethyl-thionophosphoric acid chloride in water.

*Analysis.*—Calculated (percent): C, 33.21; Cl, 21.32. Found (percent): C, 33.19; Cl, 21.30.

EXAMPLE 4

Preparation of O-n-propyl-O-(2,5-dichloro-4-methylmercapto-phenyl)-methyl-thionophosphonate 10 gm. (0.048 mol) of 2,5-dichloro-4-methylmercaptophenol were dissolved in a solution of 1.92 gm. (0.048 mol) of caustic soda in 8 cc. of water at 50° C., and 8.3 gm. (0.048 mol) of methyl-thionophosphoric acid-n-propyl ester chloride were added dropwise to the solution while stirring. The reaction mixture was then stirred for four hours at 60° C. and thereafter cooled, and the precipitated oil was taken up in 50 cc. of ether. The ethereal solution was extracted with 1 N sodium hydroxide and water, and the ether was evaporated. The residue was freed from volatile components by vacuum distillation at 100° C. and 0.1 mm. Hg. 12.2 gm. (73.5% of theory) of a slightly reddish oil were obtained, which was identified to be O-n-propyl-O-(2,5-dichloro-4-methylmercaptophenyl)-methyl-thionophosphonate of the formula

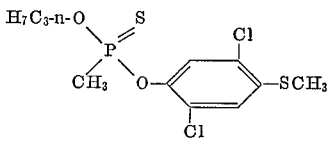

EXAMPLE 5

Using a procedure analogous to that described in Example 4, O-ethyl-O-(2,5-dichloro-4-methylmercapto-phenyl)-ethyl-thionophosphonate, a yellow oil, of the formula

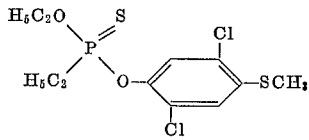

was prepared from 2,5-dichloro-4-methylmercapto-phenol and ethyl-thionophosphonic acid-ethyl ester chloride. The yield was 74% of theory.

EXAMPLE 6

Using a procedure analogous to that described in Example 4, O-ethyl-O-(2,5-dichloro-4-methylmercapto-phenyl)-phenyl-thionophosphonate, M.P. 92–94° C., of the formula

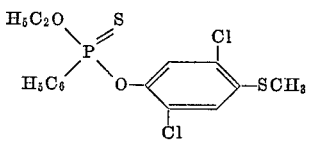

was prepared from 2,5-dichloro-4-methylmercapto-phenol and phenyl-thionophosphonic acid-ethyl ester chloride. The yield was 56.8% of theory.

EXAMPLE 7

Using a procedure analogous to that described in Example 4, O-methyl-O-(2,5 - dichloro-4-methylmercaptophenyl)-ethyl-thionophosphonate, M.P. 64–65° C. of the formula

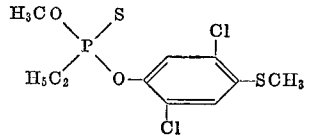

was prepared from 2,5-dichloro-4-methylmercapto-phenol and ethyl-thionophosphonic acid-methyl ester chloride. The yield was 73.4% of theory.

EXAMPLE 8

Using a procedure analogous to that described in Example 2, O,O-diethyl-O-(2,5-dichloro-4-isopropylmercaptophenyl)-thionophosphate, a light yellow oil, of the formula

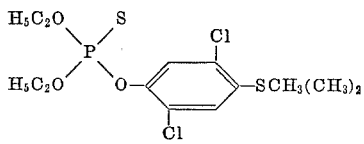

was prepared from 2,5-dichloro-4-isopropylmercapto-phenol and O,O-diethyl-thionophosphoric acid chloride. The yield was 92% of theory.

EXAMPLE 9

Using a procedure analogous to that described in Example 2, O,O-diethyl-O-(2,5-dichloro-4-n-butylmercaptophenyl)-thionophosphate, a light yellow oil, of the formula

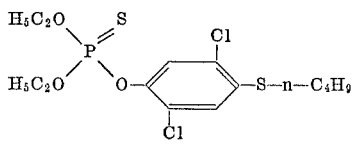

was prepared from 2,5-dichloro-4-n-butylmercapto-phenol and O,O-diethyl-thionophosphoric acid chloride. The yield was 90% of theory.

The compounds of the Formula I above have useful pesticidal properties. More particularly, they exhibit insecticidal and acaricidal activities and are especially effective for the eradication of plant lice (aphids), spider mites, houseflies, bedbugs and the like, and in this respect they are far superior to the analogous compounds described in German Pat. No. 1,116,656, as the following comparisons show:

A=O,O-diethyl-O-(2,5 - dichloro - 4 - methylmercaptophenyl)-thionophosphate; Example 2 above.
B=O,O-dimethyl-O-(2,5 - dichloro - 4 - methylmercaptophenyl)-thionophosphate; Example 3 above.
C=O,O-dimethyl-O-(3 - methyl - 4 - methylmercaptophenyl)-thionophosphate; German Pat. 1,116,656.
$ED_{50}$=Active ingredient concentration in parts per million (p.p.m.) causing 50% kill.
$ED_{90}$=Active ingredient concentration in parts per million (p.p.m.) causing 90% kill.
$ED_{95}$=Active ingriedient concentration in parts per million (p.p.m.) causing 95% kill.
$ED_{99}$=Active ingredient concentration in parts per million (p.p.m.) causing 99% kill.

| | Effectiveness against (in p.p.m.)— | | | | | | |
|---|---|---|---|---|---|---|---|
| | Plant lice (aphids) | | Spider mites | | | Houseflies | Bedbugs |
| Compound | $ED_{50}$ | $ED_{90}$ | $ED_{50}$ | $ED_{95}$ | $ED_{99}$ | [1] $ED_{95}$ | [2] $ED_{95}$ |
| A | 0.9 | 4.3 | <0.9 | 1.2 | 3.6 | 0.003 | |
| B | 1.0 | 8.0 | | | | 0.003 | 0.001 |
| C | 3.3 | 9.7 | 1.95 | 6.8 | 11.3 | 0.008 | 0.006 |

[1] After 60 minutes.
[2] One day.

The above comparative data show that the compounds according to the present invention are several times more effective than the closely related compound of the German patent.

For insecticidal or acaricidal purposes the phosphorus compounds of the present invention are admixed with a customary solid or liquid carrier to form such conventional pesticidal compositions as solutions, suspensions, dusting powders, pastes or the like, and the composition is then disseminated in the area infested with the insects or acarids to be eradicated by spraying, painting or scattering. The preferred concentration of the active insecticidal ingredient in such compositions is from 0.01 to 3% by weight, based on the total weight of the composition.

For instance, an effective insecticidal dusting powder is obtained by spraying two parts by weight of a compound of the Formula I onto 98 parts by weight of kaolin, and milling the mixture into a fine homogeneous powder.

Similarly, a wettable powder is obtained by spraying 25 parts by weight of a compound of the Formula I onto 73 parts by weight of kieselguhr, adding thereto 2 parts by weight of naphthalene sodium sulfonate, and milling the mixture into a fine homogeneous powder, which is then admixed with water until the desired active ingredient concentration is achieved. The resulting aqueous suspension is an effective insecticidal composition.

Finally, an emulsion is obtained by dissolving 20 parts by weight of a compound of the Formula I in 75 parts by weight of xylene, and adding 5 parts by weight of ricinoleic acid butyl ester sulfonate to the solution. The emulsion is then diluted with water until the desired active ingredient concentration is achieved. The aqueous suspension is an effective insecticidal composition.

While the present invention has been illustrated with the aid of certain specific embodiments thereof, it will be readily appreciated by others skilled in the art that the invention is not limited to these particular embodiments, and that various changes and modifications may be made without departing from the spirit of the invention and the scope of the appended claims.

We claim:
1. A compound of the formula

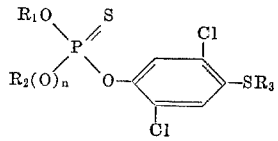

wherein
$R_1$ and $R_3$ are each alkyl of 1 to 4 carbon atoms,
$R_2$ is alkyl of 1 to 3 carbon atoms or phenyl, and $n$ is 0 or 1.

2. A compound of the formula

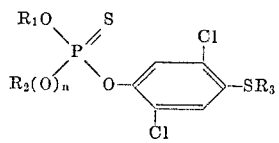

wherein
$R_1$ is alkyl of 1 to 3 carbon atoms,
$R_2$ is methyl, ethyl or phenyl,
$R_3$ is alkyl of 1 to 4 carbon atoms, and $n$ is 0 or 1.

3. A compound according to claim 2, wherein $R_1$ is n-propyl, $R_2$ and $R_3$ are methyl, and $n$ is 0.

4. A compound according to claim 2, wherein $R_1$ and $R_2$ are ethyl, $R_3$ is methyl, and $n$ is 0.

5. A compound according to claim 2, wherein $R_1$ is ethyl, $R_2$ is phenyl, $R_3$ is methyl, and $n$ is 0.

6. A compound according to claim 2, wherein $R_1$ and $R_3$ are methyl, $R_2$ is ethyl, and $n$ is 0.

7. A compound according to claim 2, wherein $R_1$, $R_2$ and $R_3$ are methyl, and $n$ is 1.

8. A compound according to claim 2, wherein $R_1$ and $R_2$ are ethyl, $R_3$ is methyl, and $n$ is 1.

References Cited

UNITED STATES PATENTS 3,042,703   7/1962   Schegk et al. -------- 260—949

FOREIGN PATENTS 242,406   5/1959   Australia ----------- 260—949

CHARLES B. PARKER, Primary Examiner

R. L. RAYMOND, Assistant Examiner

U.S. Cl. X.R.

260—609F, 973; 424—216

UNITED STATES PATENT OFFICE
CERTIFICATE OF CORRECTION

Patent No. 3,600,472           Dated August 17, 1971

Inventor(s) RICHARD SEHRING and WOLFGANG BUCK

It is certified that error appears in the above-identified patent and that said Letters Patent are hereby corrected as shown below:

Column 1, line 58;     that portion of the formula reading $P\diagup^S_S$

Column 4, line 67;

Column 5, line 7;      should read $P\mathbin{\!/\mkern-5mu/\!}^S$

Column 5, line 9:      that portion of the formula reading $$-SCH_3(CH_3)_2$$

should read $$-SCH(CH_3)_2$$

Signed and sealed this 28th day of March 1972.

(SEAL)
Attest:

EDWARD M. FLETCHER, JR.          ROBERT GOTTSCHALK
Attesting Officer                   Commissioner of Patents